United States Patent
Tokoi et al.

(10) Patent No.: US 10,992,203 B2
(45) Date of Patent: Apr. 27, 2021

(54) AXIAL GAP TYPE ROTARY ELECTRIC MACHINE

(71) Applicant: Hitachi Industrial Equipment Systems Co., Ltd., Tokyo (JP)

(72) Inventors: Hirooki Tokoi, Tokyo (JP); Shuuichi Takahashi, Tokyo (JP); Yasuei Yoneoka, Tokyo (JP); Toshifumi Suzuki, Tokyo (JP); Kenji Uzawa, Tokyo (JP); Katsuyuki Yamazaki, Tokyo (JP); Toru Sakai, Tokyo (JP); Ryousou Masaki, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 366 days.

(21) Appl. No.: 16/097,738

(22) PCT Filed: May 18, 2016

(86) PCT No.: PCT/JP2016/064673
§ 371 (c)(1),
(2) Date: Oct. 30, 2018

(87) PCT Pub. No.: WO2017/199355
PCT Pub. Date: Nov. 23, 2017

(65) Prior Publication Data
US 2020/0395808 A1   Dec. 17, 2020

(51) Int. Cl.
*H02K 11/00* (2016.01)
*H02K 3/52* (2006.01)
(Continued)

(52) U.S. Cl.
CPC ............ *H02K 3/522* (2013.01); *H02K 5/225* (2013.01); *H02K 21/24* (2013.01); *H02K 2203/06* (2013.01); *H02K 2203/12* (2013.01)

(58) Field of Classification Search
CPC ...... H02K 21/24; H02K 1/2793; H02K 1/148; H02K 1/182; H02K 3/28; H02K 3/50;
(Continued)

(56) References Cited

U.S. PATENT DOCUMENTS 8,482,180 B2   7/2013 Seki et al.
10,530,211 B2 * 1/2020 Kitamura ............... H02K 3/522
(Continued)

FOREIGN PATENT DOCUMENTS

CN   1543042 A   11/2004
CN   2822017 Y    9/2006
(Continued)

OTHER PUBLICATIONS

International Search Report (PCT/ISA/210) issued in PCT Application No. PCT/JP2016/064673 dated Aug. 30, 2016 with English translation (three (3) pages).
(Continued)

*Primary Examiner* — Thanh Lam
(74) *Attorney, Agent, or Firm* — Crowell & Moring LLP

(57) ABSTRACT

The purpose of the present invention is to ensure reliability and installation space reduction of crossover wires of an axial gap type rotary electric machine. An axial gap type rotary electric machine having: a stator which is constructed by annularly arranging multiple core units about an axis of rotation, each of the core units having at least a core, windings disposed around the outer periphery of the core, and crossover wires leading out from the windings; at least one rotor which faces an axial end surface of the cores with a gap therebetween; and a rotary shaft which rotates along with the rotor. The axial end surface side and the outer diameter side of the stator, is provided with multiple wiring support sections, each having an arc-shaped base part extending in a rotational direction along the annular shape of
(Continued)

the outer diameter side of the stator, wherein the base part has a length extending over the outer diameter-side end surfaces of two or more adjoining core units and a predetermined axial width, and is equipped with multiple axial grooves for guiding the crossover wires in the rotational direction which are disposed on the opposite surface of the base from the rotary shaft. The rotary electric machine has a molding resin for integrally molding the wiring support sections with the stator.

12 Claims, 13 Drawing Sheets

(51) Int. Cl.
 *H02K 5/22* (2006.01)
 *H02K 21/24* (2006.01)
(58) Field of Classification Search
 CPC .. H02K 2203/06; H02K 2203/12; H02K 3/38;
  H02K 5/225; H02K 15/045; H02K 16/00
 USPC ....... 310/71, 114, 156.32, 194, 268, 216.113
 See application file for complete search history.

(56) References Cited

U.S. PATENT DOCUMENTS

| | | | |
|---|---|---|---|
| 2004/0164641 A1 | 8/2004 | Yamada et al. | |
| 2006/0163964 A1* | 7/2006 | Kojima | H02K 1/182 310/156.37 |
| 2007/0001534 A1* | 1/2007 | Kojima | H02K 3/524 310/156.37 |
| 2007/0046140 A1* | 3/2007 | Shibukawa | H02K 21/24 310/268 |
| 2008/0106161 A1* | 5/2008 | Matsuzaki | H02K 3/524 310/71 |
| 2008/0191562 A1* | 8/2008 | Kojima | H02K 21/24 310/43 |
| 2013/0115064 A1 | 5/2013 | Kimura et al. | |
| 2014/0009009 A1 | 1/2014 | Deguchi et al. | |
| 2015/0349588 A1* | 12/2015 | Tokoi | H02K 3/522 310/208 |
| 2015/0372544 A1 | 12/2015 | Iwasaki et al. | |
| 2017/0155297 A1 | 6/2017 | Tokoi et al. | |
| 2017/0163119 A1 | 6/2017 | Ulbrich et al. | |
| 2017/0194823 A1 | 7/2017 | Tokoi et al. | |

FOREIGN PATENT DOCUMENTS

| | | |
|---|---|---|
| CN | 101286657 A | 10/2008 |
| CN | 102986120 A | 3/2013 |
| CN | 203660698 U | 6/2014 |
| CN | 104106199 A | 10/2014 |
| CN | 204131349 U | 1/2015 |
| CN | 204334137 U | 5/2015 |
| DE | 10 2012 020 329 A1 | 4/2014 |
| DE | 10 2014 221 188 A1 | 4/2016 |
| EP | 1 921 731 A2 | 5/2008 |
| EP | 2 124 320 A2 | 11/2009 |
| JP | 2008-118833 A | 5/2008 |
| JP | 2010-183727 A | 8/2010 |
| JP | 2010-284003 A | 12/2010 |
| JP | 2012-213275 A | 11/2012 |
| JP | 2013-118750 A | 6/2013 |
| JP | 2015-50798 A | 3/2015 |
| TW | M359868 U1 | 6/2009 |
| TW | 201541814 A | 11/2015 |
| WO | WO 2004/008610 A1 | 1/2004 |
| WO | WO 2015/159332 A1 | 10/2015 |

OTHER PUBLICATIONS

Japanese-language Written Opinion (PCT/ISA/237) issued in PCT Application No. PCT/JP2016/064673 dated Aug. 30, 2016 (three (3) pages).
Taiwanese-language Office Action issued in counterpart Taiwanese Application No. 10621143830 dated Nov. 9, 2017 (five (5) pages).
Extended European Search Report issued in counterpart European Application No. 16902374.4 dated Dec. 9, 2019 (11 pages).
Chinese-language Office Action issued in counterpart Chinese Application No. 201680081215.8 dated Aug. 2, 2019 (six (6) pages).
Chinese-language Office Action issued in Taiwanese Application No. 107140641 dated Jul. 2, 2020 with partial English translation (five pages).
Taiwanese-language Office Action issued in counterpart Taiwanese Application No. 106112279 dated Nov. 9, 2017 (five (5) pages).
English translation (Taiwanese-language Office Action previously filed on Oct. 30, 2018) (four (4) pages).
Extended European Search Report issued in European Application No. 16 902 374.4 dated Jan. 12, 2021 (eight (8) pages).

* cited by examiner

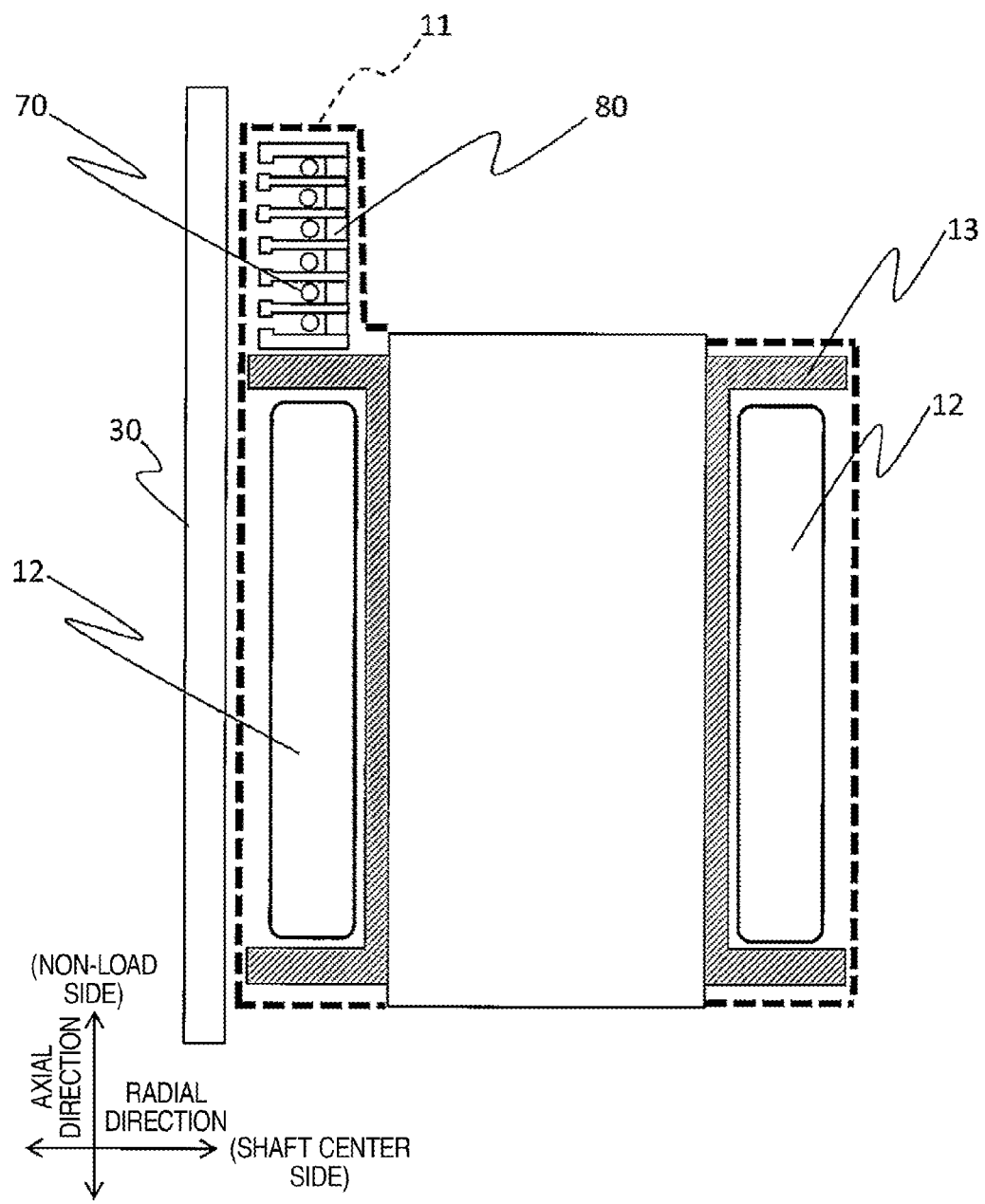

AXIAL GAP TYPE ROTARY ELECTRIC MACHINE

TECHNICAL FIELD

The present invention relates to axial gap type rotary electric machines, and more particularly to an axial gap type rotary electric machine including a wire holding portion holding a crossover wire.

BACKGROUND ART

An axial gap type rotary electric machine is formed by disposing a cylindrical stator and a disk-shaped rotor in an opposed manner, and is regarded as being suitable for providing a thinner structure than radial gap type rotary electric machines. In such a rotary electric machine, windings are disposed close to a housing (its inner periphery), so that the crossover wires drawn out from the windings of the stators are often disposed on the external diameter side of the rotor. The crossover wires may preferably be fixed with a mold, such as a resin, along with a core and windings to prevent movement.

Meanwhile, it is desired to dispose the largest rotor within a limit to increase torque and improve efficiency of the axial gap type rotary electric machine. This reduces space for disposing the crossover wires. If the crossover wire is drawn out from the space, the crossover wire may cause damage due to interference with the rotor or insulation failure caused by the touching with the housing, or the like.

It is, therefore, important in the axial gap type rotary electric machine to reduce space where the crossover wire is disposed to improve the characteristic of the rotary electric machine while maintaining its reliability.

Patent Literature 1 discloses an axial air-gap electronic motor that includes a crossover wire treatment portion that extends axially on the outer periphery side of the end face of an insulator that serves as a core member, and a plurality of supporting grooves provided on the outer diameter side of the crossover wire treatment portion and extending in a rotary direction to dispose a crossover wire, the supporting grooves support the crossover wire of each core member via adjacent crossover wire treatment portion.

CITATION LIST

Patent Literature

PATENT LITERATURE 1: JP-A-2008-118833

SUMMARY OF INVENTION

Technical Problem

Patent Literature 1 discloses the structure in which the crossover wire treatment portion is disposed for each core member. Therefore, the structure has a characteristic in that a large distance is provided between adjacent crossover wire treatment portions. In such a structure, the crossover wire is disposed linearly between the crossover wire treatment portions. Correspondingly, the crossover wire is disposed on the inner diameter side. When the crossover wire is disposed linearly between the adjacent crossover wire treatment portions, the crossover wire forms a polygonal region. If a resin is used to mold the crossover wire treatment portion and the crossover wire integrally with the core members to provide a resin mold stator, only a resin mold of a size capable of contacting internally with the polygonal region can be used. In other words, a problem of correspondingly limiting the diameter measurement of the rotor occurs, causing a disadvantage in terms of performance and downsizing. If a resin mold having the diameter measurement larger than the polygonal region is used, such a resin mold would damage the crossover wire during insertion and removal of the resin mold.

In addition, the crossover wire treatment portion of Patent Literature 1 is column-shaped having a smaller diameter measurement relative to the wiring distance of the crossover wire. Correspondingly, this leads to reduction of an area of the groove engaging the crossover wire, possibly causing falling off of the crossover wire from the groove due to a sealing pressure during working or resin molding, or may decrease the operability and damage the crossover wire.

Further, the crossover wire treatment portion of Patent Literature 1 has a planar surface that is in contact with the resin mold (e.g., a side surface on the inner diameter side). When the resin sealing is carried out with the planar surface being in contact with the resin mold, the resin of the contact portion might be thin-walled. Such a thin-walled portion possibly causes peel-off of the resin due to vibrations in activation or change by aging. Further, the peeled resin might cause an adverse effect on elements of the electrical machine or mechanical elements.

There is a need for the axial gap type rotary electric machine having reliability of the crossover wires and a reduced arrangement space for the crossover wires.

Solution to Problem

The above problem is solved by adopting, for example, the configuration recited in the appended claims. Specifically, in an axial gap type rotary electric machine including a stator configured by annularly disposing a plurality of core units about an axis of rotation, each core unit at least including a core, a winding disposed around an outer periphery of the core, and a crossover wire drawn out from the winding, at least a rotor configured to face an axial end face of the core via a gap, and a rotating shaft configured to rotate with the rotor, the axial gap type rotary electric machine includes a plurality of wiring support portions provided on an axial end face side and an outer diameter side of the stator, each wiring support portion including a base having an arc shape and extending in a rotating direction along an annular shape on the outer diameter side of the stator, in the base having a length extending over the end face on the outer diameter side of adjacent two or more of the core units and a predetermined width in an axial direction, a plurality of grooves in the axial direction for guiding the crossover wire in a rotating direction on a surface of the base opposite to the rotating shaft center direction, and a molding resin for integrally molding the wiring support portions and the stator.

Advantageous Effects of Invention

In one aspect of the present invention, the crossover wires are provided reliably without being damaged, while space-saving arrangement of the crossover wires is achieved. Thus, the axial gap type rotary electric machine can achieve a high output, high efficiency, and small size.

Other problems, structure, and effects will be apparent from the following description.

BRIEF DESCRIPTION OF DRAWINGS

FIG. 8 is a partial cross-sectional view schematically illustrating the structure of the stator, the wiring piece, the housing, and the molding resin of the first embodiment.

DESCRIPTION OF EMBODIMENTS

Embodiments of the present invention will be described in detail by referring to the accompanying drawings.

First Embodiment

Figure 1:
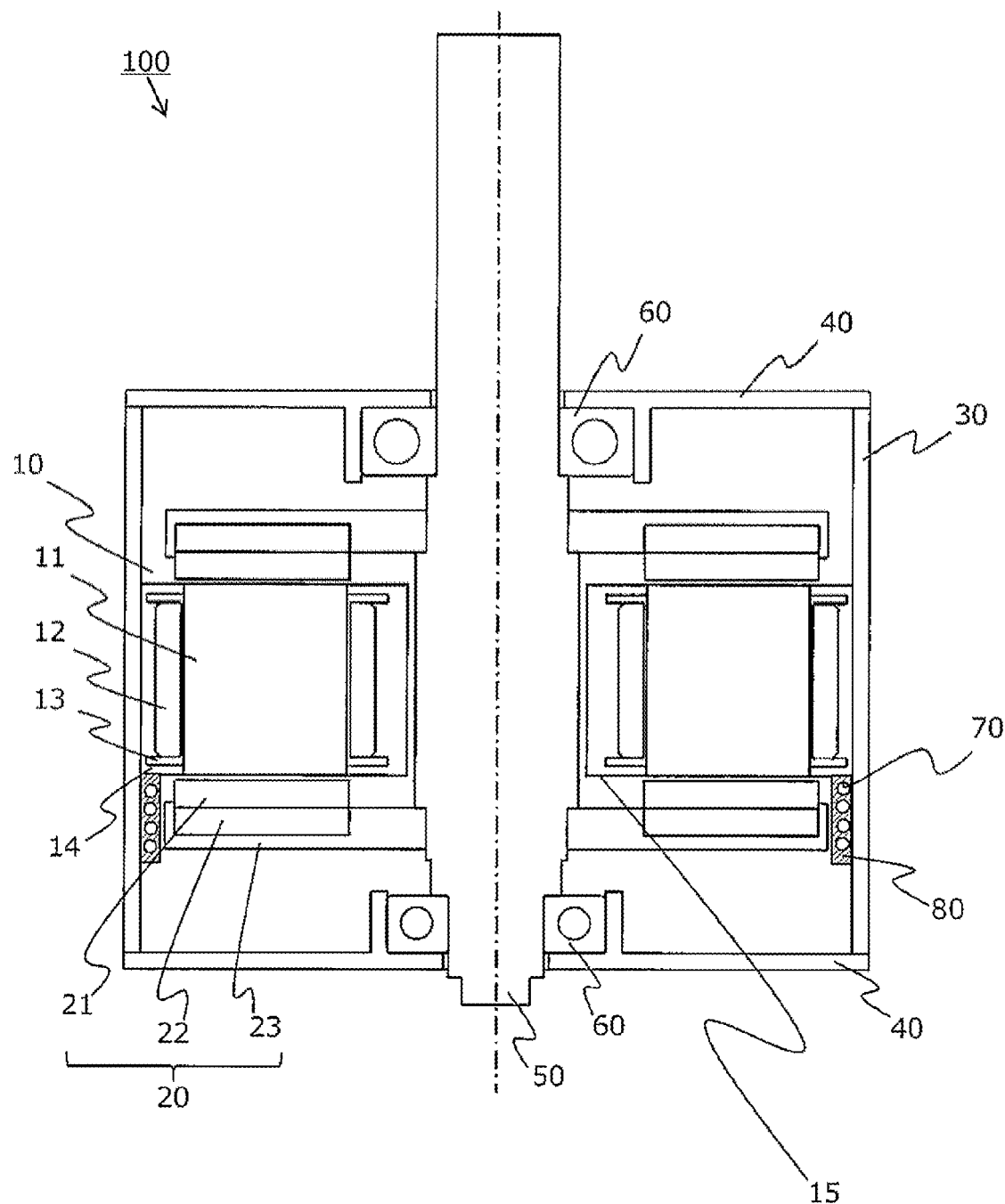
FIG. 1 is a vertical cross-sectional view illustrating the structure of an electric motor according to a first embodiment to which the present invention is adapted.

FIG. 1 is a vertical cross-sectional view taken in a direction of a rotating shaft of an axial gap type electric machine 100 (hereinafter simply referred to as an electric machine 100) according to a first embodiment to which the present invention is adapted.

The electric machine 100 includes a stator 10 having an approximately annular shape and two disk-shaped rotors 20 disposed to sandwich the stator in a direction of a rotating shaft. The rotors 20 are disposed to face each other in an axial direction via a predetermined gap.

The rotors 20 are fixed such that the center portion of the rotors 20 rotate along with a shaft (rotating shaft) 50, and a load side and a non-load side of the shaft 50 are supported by a bracket 40 via a bearing 60, 60. The bracket 40 is fixed with a bolt or the like to the end portion of a housing 30 near the outer diameter, the housing 30 having an approximately cylindrical shape.

The rotors 20 each include a magnet 21, a back yoke 22, and a yoke 23. The magnet 21 is a permanent magnet, and various kinds of magnets such as neodymium or ferrite can be used according to specifications. The back yoke 22 serves as a base of the rotor 20, has a disk shape, and includes a plurality of magnets 21 fixed on one end face of the back yoke 22 via the yoke 23 with an adhesive or by mechanical fixing. In one example, the magnet 21 is wedge-shaped for each pole, and the magnets 21 are arranged annularly with one faces of adjacent magnets in the axial direction having different poles (S, N).

The stator 10 is formed by arranging a plurality of core units (twelve core units in this embodiment) 14 annularly about the shaft 50, with each core unit 14 being wound by the winding 12 via the bobbin 13 made of an insulating member around the outer periphery of the core 11. The stator 10 includes a molding resin 15 covering, partially or entirely, adjacent core units 14 and inner and outer periphery sides and axially end faces of the annular body, for example, to fix or insulate the stator 10 formed of the annular body to and from the housing 30.

A crossover wire 70 drawn out from each core unit 14 is disposed on a non-load side (lower portion of the drawing) end face of the stator 10 and the inner periphery side of the housing 30 via a wiring piece (wiring support portion) 80.

In addition, the stator 10 includes a molding resin 15 covering, partially or entirely, adjacent core units 14 and the inner and outer periphery sides and axially end faces of the annular body to fix or insulate between the stator 10 and the wiring piece 80 formed of the annular body, and to fix or insulate these elements to and from the housing 30.

Figure 2A:
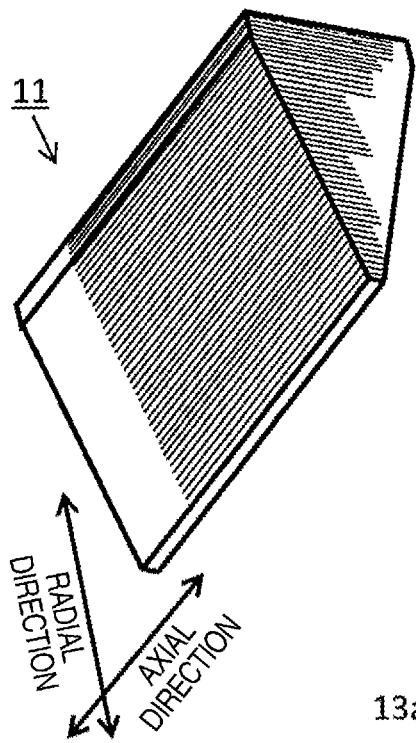
FIGS. 2A to 2C are perspective views schematically illustrating the structure of a core unit according to the first embodiment.

FIG. 2 schematically illustrates an example structure of the core unit 14. FIG. 2(a) is a perspective view schematically illustrating an external structure of the core 11. The core 11 is formed by layering, for example, steel plates in a radial direction to provide a column-shaped body having an approximately trapezoidal cross-section in the direction of a rotating shaft center. The layering members may be foils or the like instead of steel plates. In the present embodiment, amorphous foils are layered. The layering members increase their widths gradually in the rotating direction as the layering members proceed from the rotating shaft in the radial direction. Thus, the core 11 becomes column-shaped with an approximately trapezoidal cross section. Instead of the trapezoidal shape, the cross-section may be in a circular or diamond shape. Alternatively, other shape of layering members may be used to form the column-shaped body. Further, the core 11 may not be formed of the layered body, and may be provided as a core by shaving or pressed powder molding. Alternatively, instead of the column-shaped body having the same cross-section in the axial direction, the core 11 may be a column-shaped body having partially different measurements in the rotating direction or radial direction.

Figure 2B:
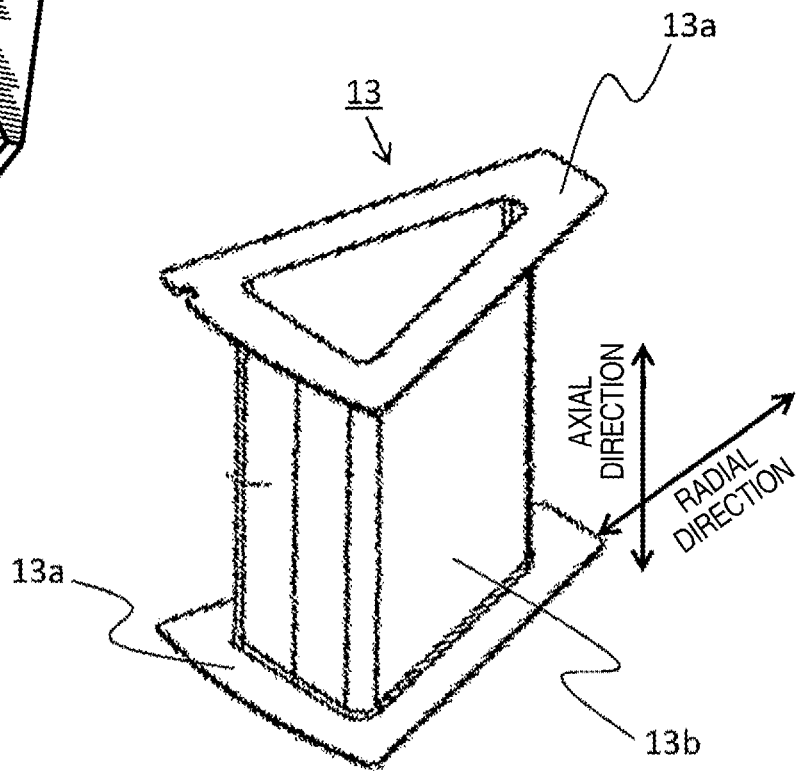

FIG. 2(b) is a perspective view illustrating an outer structure of the bobbin 13. The bobbin 13 is made of an insulating member such as resin, and includes a tubular portion 13b extending in the axial direction and a guard portion 13a extending for a predetermined width in the rotating direction along the shape of an edge of an opening of the tubular portion 13b near both end portions of the opening. The tubular portion 13b includes an inner tubular portion that approximately matches the shape and size of the outer periphery shape of the core 11 to allow insertion of the core 11 into the inner tubular portion. Alternatively, the core 11 may be set in a molding tool so that the bobbin 13 can be formed by injection molding.

Figure 2C:
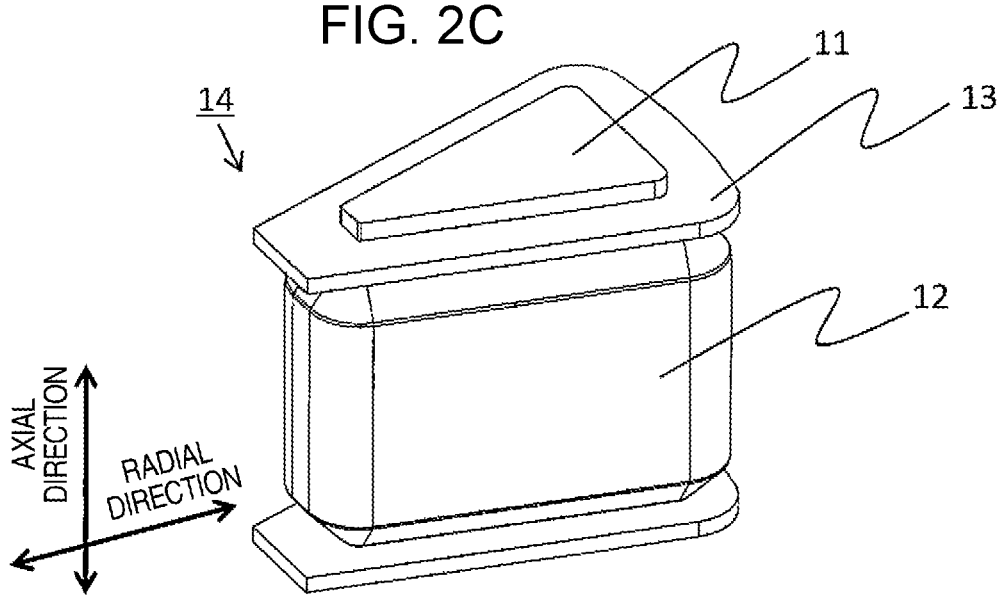

FIG. 2(c) is a perspective view illustrating the structure of the core unit 14. The core unit 14 includes a winding 12 over an outer tube of the tubular portion 13b of the bobbin 13. The winding 12 is wound between two guard portions 13a formed near both ends in the axial direction.

Figure 3A:
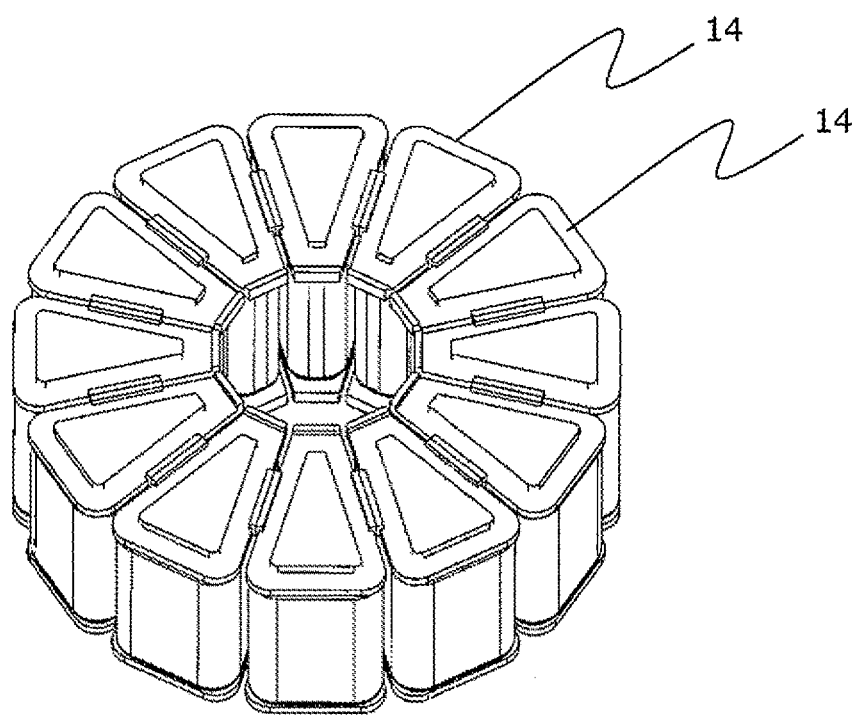
FIGS. 3A and 3B are perspective views schematically illustrating the arrangement structure of core units of a stator according to the first embodiment.

The core units 14 formed as described above are arranged annularly about the rotating shaft, as illustrated in FIG. 3(a).

Figure 3B:
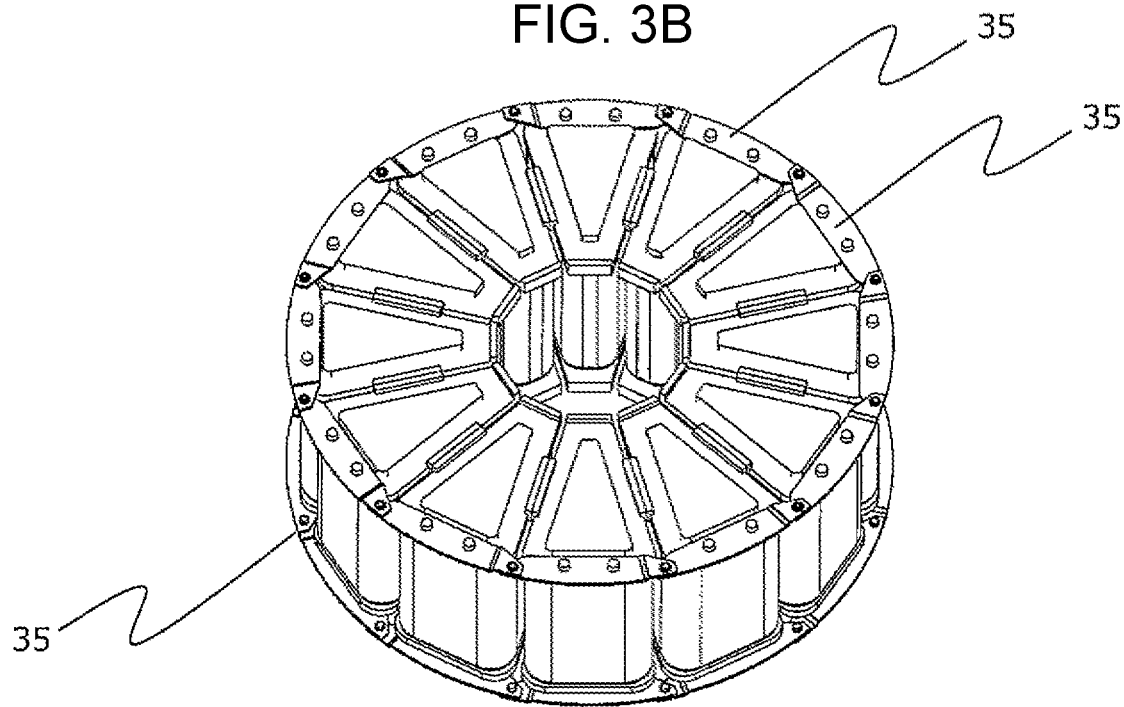

Then, as illustrated in FIG. 3(b), connecting members 35 for connecting adjacent core units 14 are fixed to the outer diameter side of the guard portions 13a of the bobbins to connect the end portions of the adjacent connecting members 35. Thus, the annular arrangement of the stator 10 can be maintained. The stator 10 is put in the housing 30 with wiring pieces 80 which are described later. The stator 10 is sandwiched by the resin mold inserted from both openings of the housing 30 and molded by sealing with the molding resin 15. The connecting members 35 may not always be needed in the embodiment of the present invention. Alternatively, other fixing members may be used to maintain the annular state of the stator 10, or no fixing members may be used.

Next, the wiring piece (wiring support portion) 80 provided as a characteristic of the embodiment is described. The winding 12 of each core unit 14 is drawn out as the crossover wire 70 toward one side of the axial direction of the stator 10. A plurality of drawn-out crossover wires 70 are arranged to extend near the outer diameter of one end face in the axial direction of the stator 10 and along the inner periphery of the housing 30 in the rotating direction. More specifically, the crossover wire 70 is disposed to extend along other crossover wires 70 arranged in the rotating direction along the inner periphery of the housing 30. The crossover wires 70 then go out of an outlet 31 (see FIG. 6) of the housing 30. As a result, a part of the crossover wires 70 is disposed along the inner periphery of the housing so as to partially overlap a horizontal projection plane of the rotor 20. In other words, the outer peripheral side of the rotor 20 is partially or entirely located in a non-contact manner closer to the shaft center side than the crossover wires 70 arranged in the axial direction over the inner periphery of the housing. This achieves flatness in the axial direction of the machine which is one of the characteristics of the axial gap type rotary electric machine. The crossover wires 70 extending out of the housing 30 are connected to a power source terminal via a terminal box or the like.

Figure 4A:
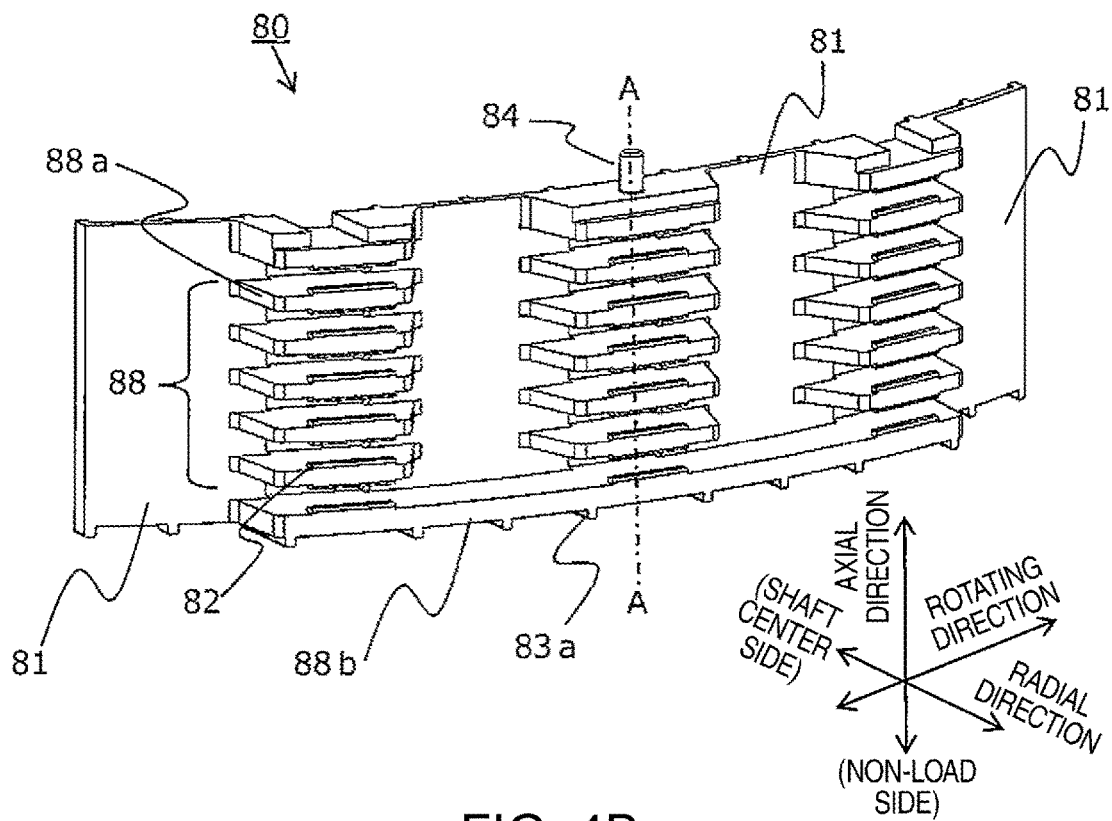
FIGS. 4A and 4B are perspective views illustrating the structure of a wiring piece according to the first embodiment.
Figure 4B:
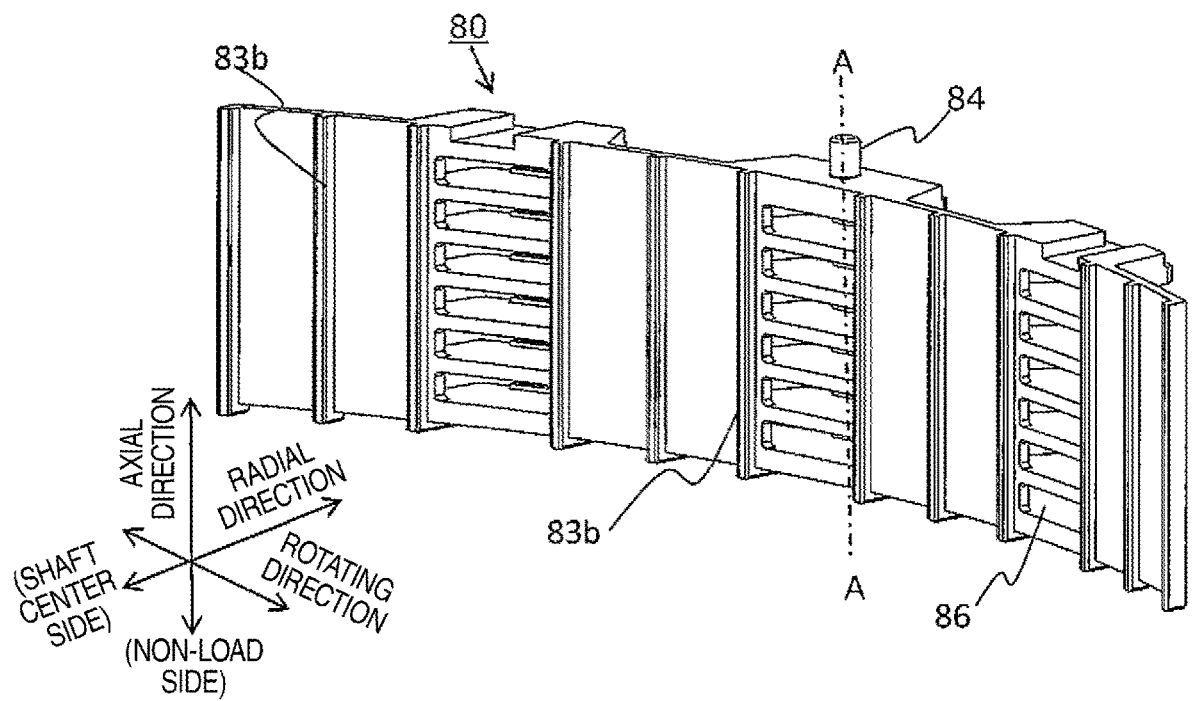
Figure 5:
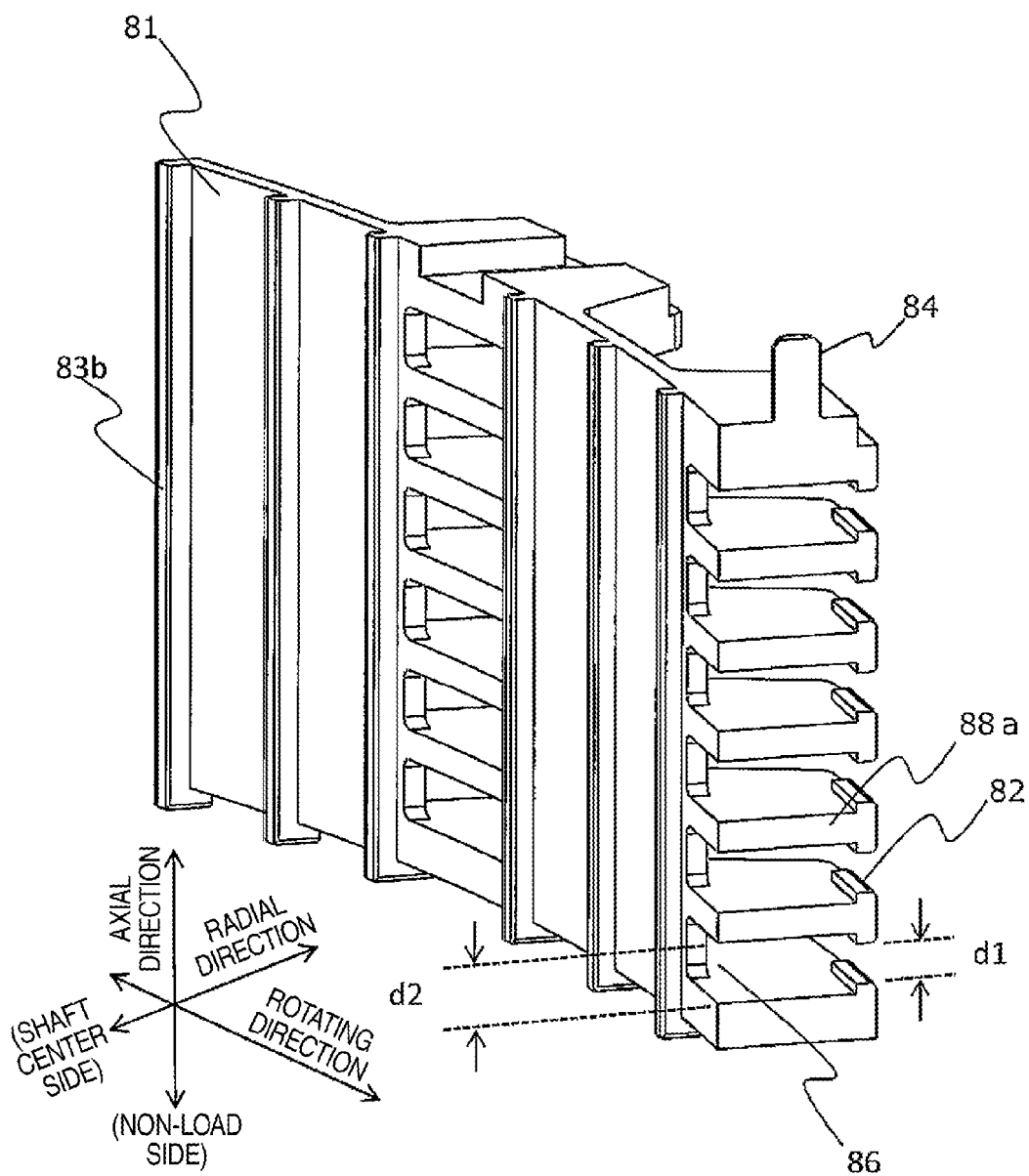
FIG. 5 is a perspective view of a partial cross-sectional view and the like of a part of the wiring piece of the first embodiment.
Figure 6:
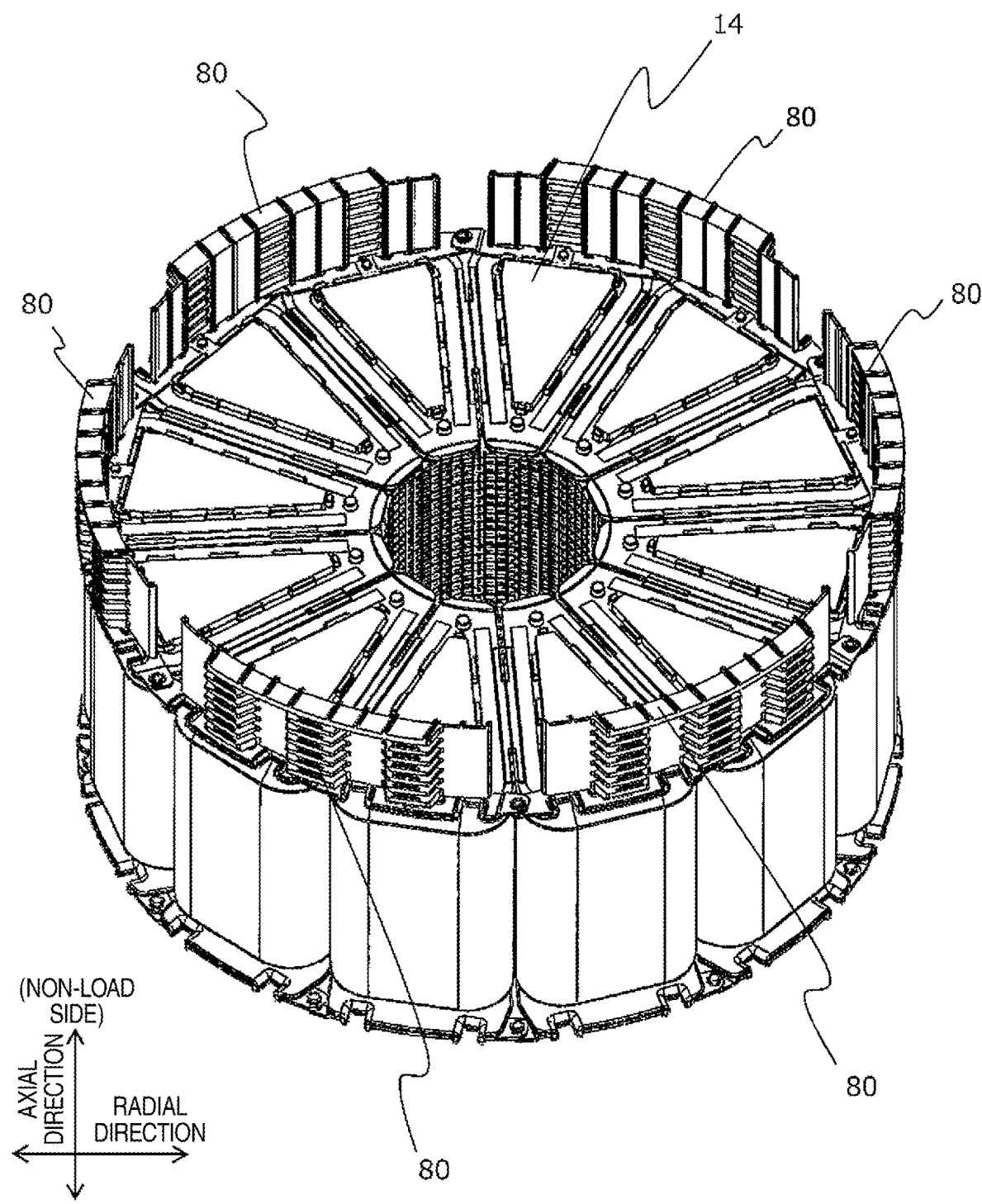
FIG. 6 is a perspective view schematically illustrating arrangement of the stator and a wiring piece according to the first embodiment.

FIGS. 4, 5, and 6 schematically illustrate the structure of the wiring piece 80. FIG. 4(a) is a perspective view of the wiring piece 80 observed from the outer periphery side of the electric machine 100. FIG. 4(b) is a perspective view observed from the inner periphery side of the electric machine 100. (In both drawings, assume that the stator 10 faces the upper portions of the drawings.) The wiring piece 80 is made of an insulating member, and preferably a high molecular insulating member. The wiring piece 80 is arc-shaped along the inner peripheral surface of the housing 30. More specifically, the wiring piece 80 includes a base 81 on the inner diameter side, and a plurality of guide portions 88 on the outer diameter side of the base 81, the guide portions 88 serving as "grooves" for guiding the crossover wire in the rotating direction.

The base 81 has an extension width spanning over the axially end surface side and the outer diameter side of the core units 14 (two core units in the present embodiment) and a width in the axial direction. The base 81 is arc-shaped, which enables arrangement of the crossover wire 70 in an arc shape. That is, linearly arranging the crossover wire 70 is limited, and shifting the crossover wire 70 toward the shaft center side core can be prevented.

The guide portions 88 are disposed on the outer diameter side of the base 81 at predetermined intervals in the rotating direction. In the present embodiment, one wiring piece 80 includes three guide portions 88 disposed in the rotating direction. Each guide portion 88 includes guiding projections 88a (protrusions) in the axial direction for more than a few crossover wires 70. Specifically, one wiring piece 80 includes a plurality of guide portions 88 each formed of a set of the guiding projections 88a disposed in the axial direction, and such guide portions 88 are disposed in the rotating direction. The guiding projections 88a are shaped to extend toward the inner periphery of the housing 30, each having a width at least larger than the diameter measurement of the crossover wire 70 from the base 81, and also extend in the rotating direction by a predetermined width.

In each core unit 14, the crossover wire 70 is arranged in a gap (groove) between the guiding projections 88a and guided to the outlet 31 (see FIG. 7) via adjacent guide portion 88 through its guiding projections 88a. In the present embodiment, the crossover wire 70 is arranged to extend in either left or right direction, i.e., whichever shorter direction to the outlet 31 relative to a reference position that is radially point-symmetric to the outlet 31. This decreases the length of the entire crossover wire 70 extending in the axis direction, while reducing the number of layers of the crossover wire 70 arranged in the axial direction, to enable further decrease of the shaft axis of the electric machine 100.

The guiding projections 88a each have a retaining portion 82 at its tip end on the inner periphery side of the housing to extend the load side and/or the non-load side for a predetermined width. The retaining portion 82 and the opposite retaining portion 82 adjacent to each other in the axial direction form a gap equivalent to or smaller than the diameter measurement of the crossover wire 70 to prevent dropout of the crossover wire 70 disposed between the guiding projection 88a. In other words, the distance between both edges of the groove opening is smaller than the storage region of the crossover wire 70 in the axial direction. In particular, this achieves an effect of preventing incomplete molding of the crossover wire 70 in sealing the molding resin 15 when the sealing pressure presses the crossover wire 70 toward the housing from between the guiding projections 88a. In addition, the retaining portion 82 is also effective in preventing the crossover wire 70 from touching the inner periphery of the housing due to vibrations or the like of the rotary electric machine 100 during activation as well as molding. This further improves reliability of insulation.

Meanwhile, the base 81 includes radial through holes 86 that penetrate through the base 81 from the bottom of the gaps (bottom of the grooves) between the guiding projections 88a. The radial through holes 86 facilitate go-around of the resin during resin molding.

FIG. 5 is an enlarged view of an axially vertical cross-section (cross-section along line A-A of FIG. 4) of the wiring piece 80. As illustrated in the drawing, d2>d1 is satisfied, where d1 represents a width between the retaining portions 82 in the axial direction, and d2 represents a width of the radial through hole 86 in the axial direction. The crossover wires 70 are pressed toward the housing side by the pressure of the resin sealing pressure from the shaft center side via radial through holes 86, while the retaining portion 82 serves to prevent the crossover wires 70 from coming out of the guiding projections 88a toward the housing side, thus maintaining the positions of the crossover wires 70.

Referring to FIG. 4(a) again, the wiring piece 80 includes a continuous guiding projection 88b along the arc shape of the base 81 at the end of the base 81 opposite to the stator 10 in the axial direction. The continuous guiding projection 88b extends radially and has the same width as the width of the guiding projections 88a toward the housing side of the base 81, while also extending in the left and right rotating directions from the center of the base 81. The continuous guiding projection 88*b* serves to reinforce the base 81, while the surface of the continuous guiding projection 88*b* on the core unit 14 side serves as the region for arranging the crossover wire 70 similar to the guiding projections 88*a*.

The continuous guiding projection 88*b* includes a plurality of flow channel projections (protrusions) 83*a* on the surface of the continuous guiding projection 88*b* opposite to the stator 10 in the axial direction. Thus, the plurality of flow channel projections (protrusions) 83*a* extend at equal widths in the axial direction and are disposed at equal intervals in the rotating direction. Each flow channel projection 83*a* also extends toward the shaft center side, so that the tip end of the flow channel projection 83*a* in the axial direction comes to abut the resin mold during the resin molding. The base 81 further includes, on its surface on the shaft center side, other flow channel projections (protrusions) 83*b* each extending continuously from the individual flow channel projections 83*a* in the axial direction (see FIG. 4(*b*)). The flow channel projections 83*b* also come to touch the resin mold at their tip ends on the shaft center side during the resin molding. In the resin molding with the resin mold, the flow channel projections 83*a* and 83*b* form gaps serving as flow channels relative to the resin mold, thus facilitating go-around of the resin. In other words, the tip ends in the extending direction of the flow channel projections 83*a* and 83*b* maintain their abutment with the resin mold to fix the position and hold the posture of the wiring piece 80 and fill the gaps formed by the flow channel projections 83*a* and 83*b* sufficiently with the molding resin 15. Accordingly, the increase and maintaining of the thickness of the molding resin 15 disposed between the flow channel projections and the resin mold can be achieved, and peel-off of the molding resin due to vibrations during activation or degradation with aging of the electric machine 100 can be prevented. The flow channel projections 83*a* and 84*b* also achieve an effect of increasing the rigidity of the wiring piece 80.

A positioning portion 84 is a projection extending in the axial direction to position the wiring piece 80 relative to the core units 14 disposed annularly. For example, the positioning portion 84 is configured to insert into a gap or the like between adjacent guard portions 13*a* of two core units 14. In the present embodiment, the positioning portion 84 is disposed in the center in the rotating direction of the wiring piece 80. Alternatively, the embodiment of the present invention may be configured such that a plurality of projections is provided, or a protrusion is formed on the core unit 14 side such as the bobbin guard portion 13*a* and the wiring piece 80 has a corresponding recess, for example, that fits the protrusion.

FIG. 6 schematically illustrates the wiring pieces 80 disposed in the core units 14 that are disposed annularly. Assume that, in the drawing, the wiring piece 80 is installed on the non-load side of the electric machine 100.

More than one wiring piece 80 is disposed over the end portion of the outer diameter of the core units 14 (two core units in the present embodiment) in the rotating direction. In the present embodiment, one wiring piece 80 is disposed to step over a set of the core units 14, while other wiring pieces 80 are disposed for each set of core units 14. Specifically, one wiring piece 80 includes (to step over) one set of core units 14, so that excessive bulging of the storage region of the crossover wire 70 in the shaft center direction can be prevented and, correspondingly, the diameter of the rotor 20 can be maintained. At the same time, the rotor 20 can be disposed closer to the stator 10 such that at least part of the projection surface of the wiring piece 80 and the rotor 20 on the outer diameter side can overlap. Thus, the effect of reduction in length in the axial direction can also be expected.

Figure 7:
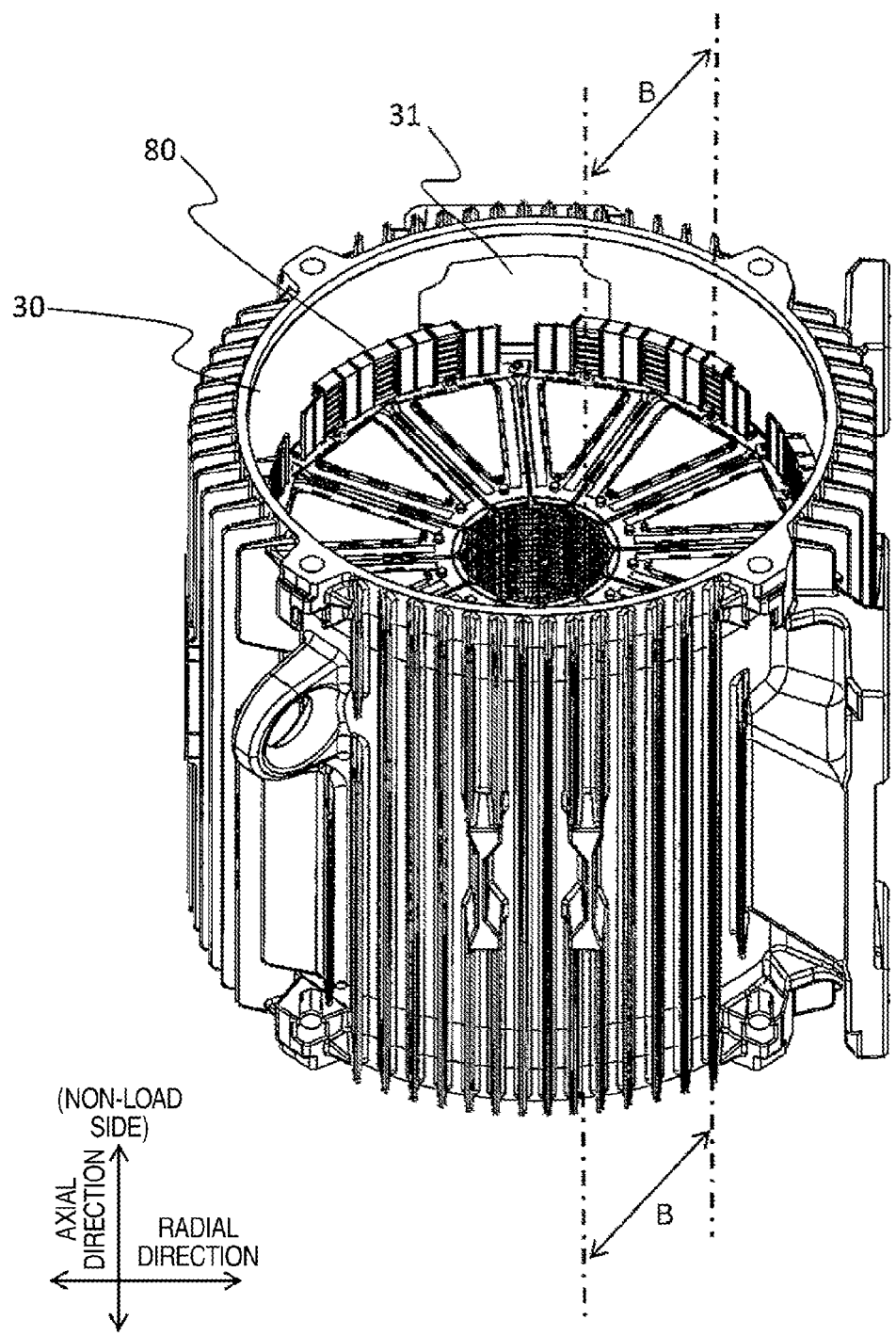
FIG. 7 is a perspective view schematically illustrating arrangement of the stator and the wiring piece in a housing according to the first embodiment.

FIG. 7 schematically illustrates the stator 10 with the wiring pieces 80 disposed therein in the housing 30. The crossover wire 70 drawn out of each core unit 14 passes through the wiring piece 80 disposed on the own core unit and adjacent wiring pieces 80 in turn in the rotating direction, and is finally drawn out of the outlet 31 to the outside of the housing 30. In this state, the resin mold (not illustrated) is inserted from both opening ends of the housing 30 to integrally cover the stator 10, the wiring pieces 80, the crossover wires, and the inner periphery of the housing with the molding resin 15.

FIG. 8 schematically illustrates the cross-section along line B-B of FIG. 7 including the core unit 14, the wiring piece 80, the molding resin 15, and the like. The wiring piece 80 is covered integrally by the molding resin 15 with the stator 10. In particular, the insulating characteristic of the crossover wires 70 can be improved and maintained, because the flow channel projections 83*a*, 83*b* and the radial through holes 86 facilitate go-around of the molding resin 15 sufficiently between the guiding projections 88*a* and 88*b* (the region where the crossover wires 70 are arranged). Accordingly, advantageous effects such as maintaining thermal stress or anti-vibration characteristic during activation and preventing dropout or peel-off from the wiring pieces 80 can be expected.

Thus, the electric machine 100 is configured such that the wiring pieces 80 that are integrally molded are provided over the core units 14 in the rotating direction, so that the holding force of the crossover wires 70 formed as lines can increase. In addition, the flow channel projections 83*a* and 83*b* and the radial through holes 86 of the wiring piece 80 facilitate go-around of the molding resin 15 to each part of the crossover wire 70 and the wiring piece. The effect of sufficient fill-in of the molding resin 15, therefore, can be expected even when one wiring piece 80 is made to have a very long shape extending in the rotating direction.

As described above, according to the first embodiment, the wiring piece 80 prevents damage of the crossover wire 70. Meanwhile, the arc shape of the wiring piece 80 prevents movement of the crossover wire 70 toward the inner diameter side and limiting the region where the rotor 20 is disposed. Further, the fact that the flow channel projections 83*a* and 84*b* abut the resin mold can improve the positioning of and holding the posture of the wiring pieces 80, and increase the thickness of the resin at the wiring pieces 80 to increase the reliability.

Second Embodiment

A wiring piece according to a second embodiment to which the present invention is adapted will be described. A wiring piece 180 of the second embodiment differs from the wiring piece of the first embodiment mainly in that the portion of the base located on the core unit side of the guiding projections extends further in the axial direction. For example, the crossover wires arranged on the wiring piece extend in the rotating direction along the shape of the inner periphery of the housing, are collected at one location in the rotating direction, and are drawn from the outlet or the like to the outside.

The outlet or the like is not always located to the same position as the collecting position of the crossover wires, due to the structural reason of the equipment to which the electric machine is installed or the structural reason of the electric machine itself. Even if the position of the outlet does not change, it may be necessary to adjust the position of drawing position of the crossover wires in the outlet. In a case where the collecting position of the crossover wires is shifted from the position of the outlet in the axial direction, it is preferable to avoid extending the collected crossover wires by the shifted distance in the axial direction in view of maintaining the crossover wires 70 and vibrations and reliability of the structure.

A main characteristic of the second embodiment is that the wiring piece includes the crossover wire 70 that can be held with its insulating characteristic being maintained, while the collecting position of the crossover wires 70 is adjustable in the axial direction. A detailed description is given below by referring to the accompanying drawings. In the description below, the constituent components similar to those in the first embodiment are indicated by the same reference signs and the description thereof may not be repeated.

Figure 9A:
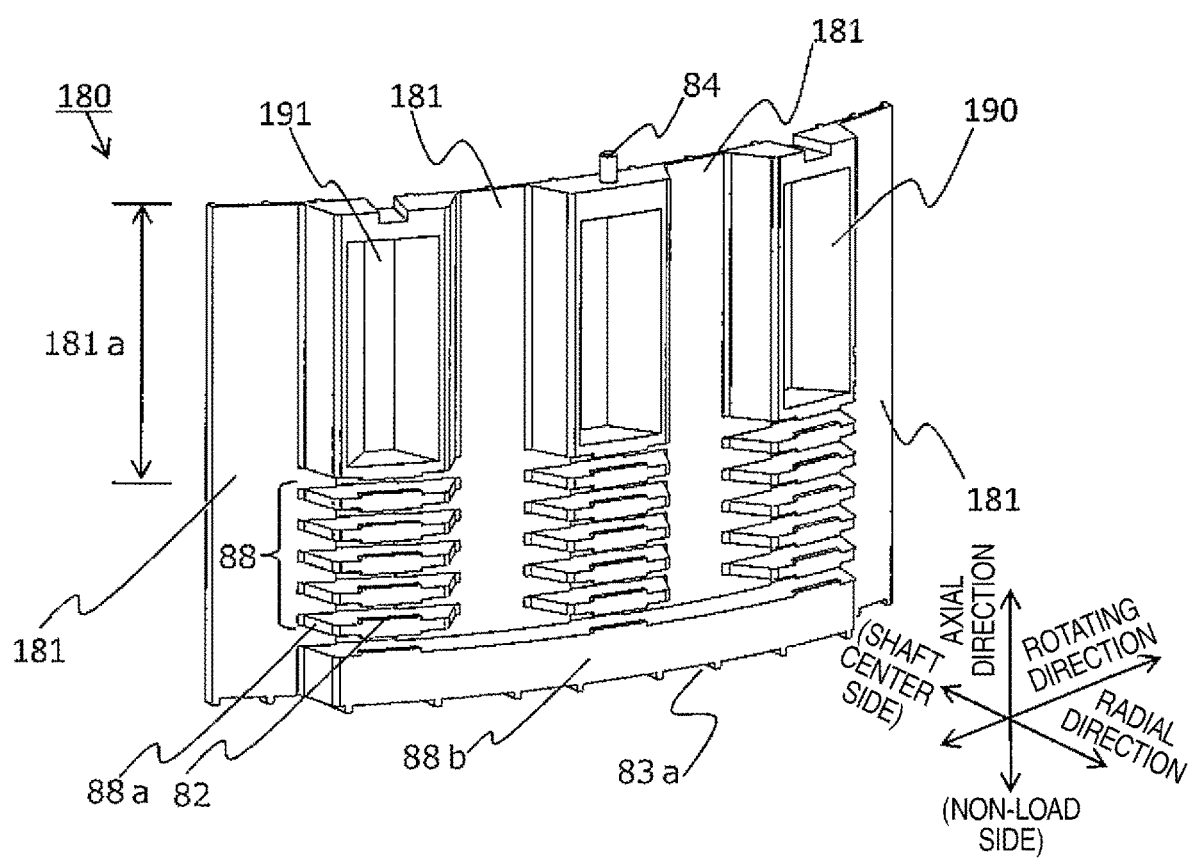
FIGS. 9A and 9B are perspective views schematically illustrating the structure of a wiring piece according to a second embodiment.
Figure 9B:
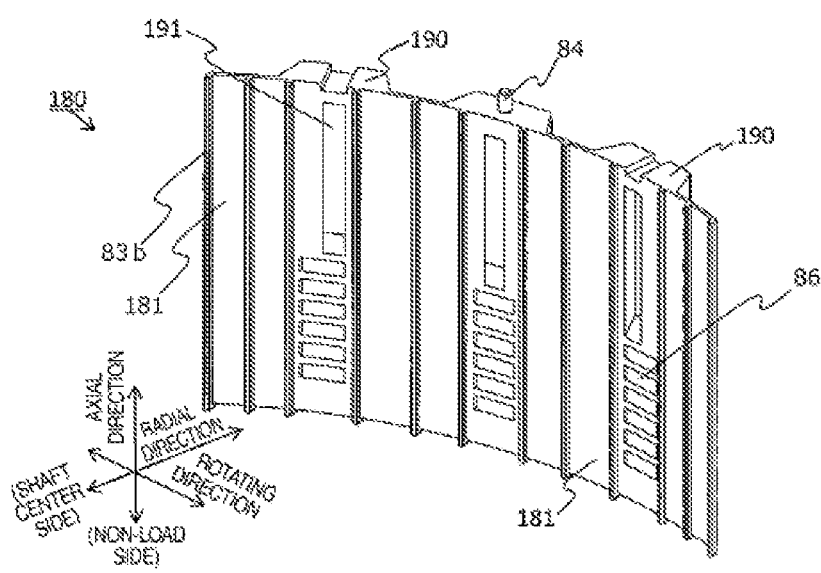

FIG. 9(a) is a perspective view of a wiring piece 180 according to the second embodiment observed from the outer diameter side. FIG. 9(b) is a perspective view schematically illustrating the wiring piece 180 observed from the shaft center side. A base 181 of the wiring piece 180 has an extended shape toward the stator 10 from the guide portion 88 (the drawing indicates an extended portion 181a). In the present embodiment, the extended portion 181a is illustrated exemplarily as having a larger width than the width of the guide portion 88 in the axial direction, but any width may be used for the extended portion in the embodiment of the present invention.

In addition, the wiring piece 181 includes a thick portion 182 at the extended portion 181a. The thick portion 182 has an approximately the same width in the axial direction as the extending width of the guide portion 88 at a position coinciding with the guide portion 88 in the axial direction. The thick portion 182 is thick between the extended portion 181a and the inner periphery side of the housing, with the thickness being equal to the extending width of the guiding projections 88a. Further, the projection surface of the thick portion 181a has an outer circle (approximately trapezoidal) shape overlapping the projection surface in the axial direction with the guiding projections 88a. The thick portion 181a also serves as a reinforcement member of the extended portion 181a.

The thick portion 181a has a tapered through hole 191 expanding from the base 181 side to the inner periphery side of the housing. The through hole 191 facilitates go-around of the molding resin 15 toward the inner periphery side of the housing of the extended portion 190.

Figure 10A:
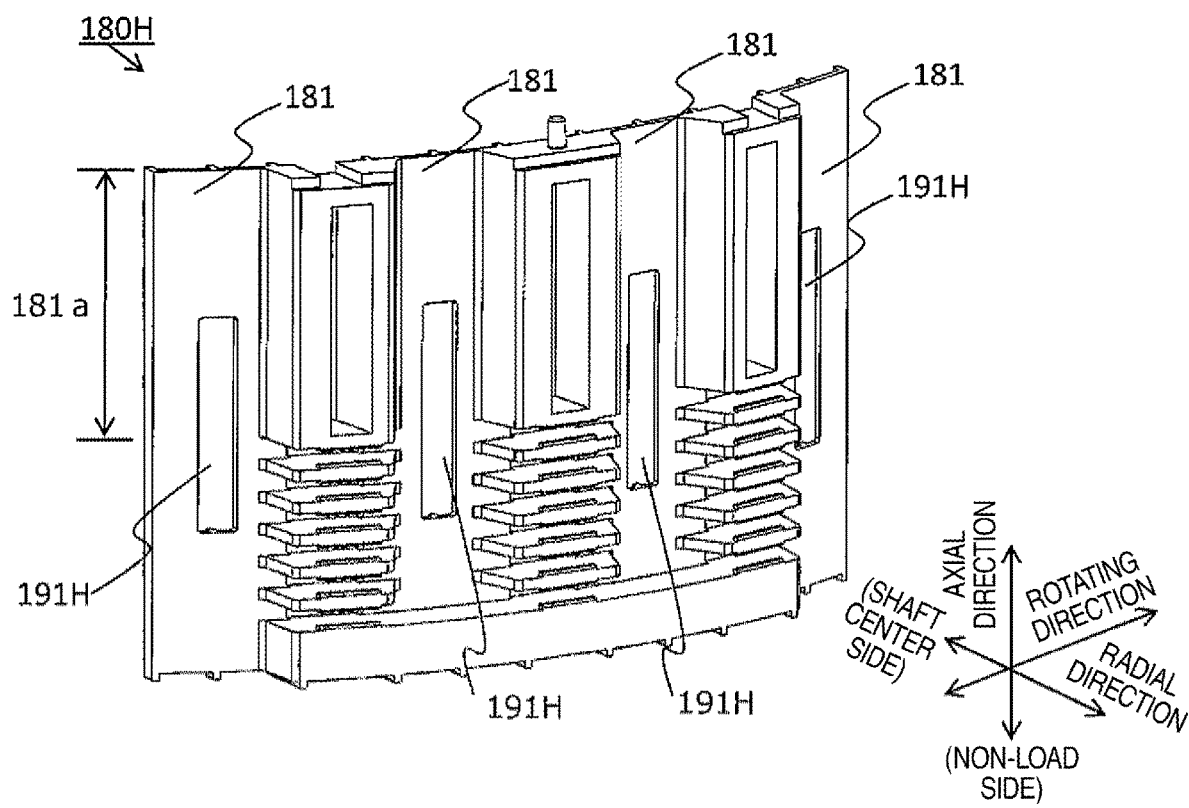
FIGS. 10A and 10B are perspective views schematically illustrating the structure of a wiring piece according to a modification of the second embodiment.
Figure 10B:
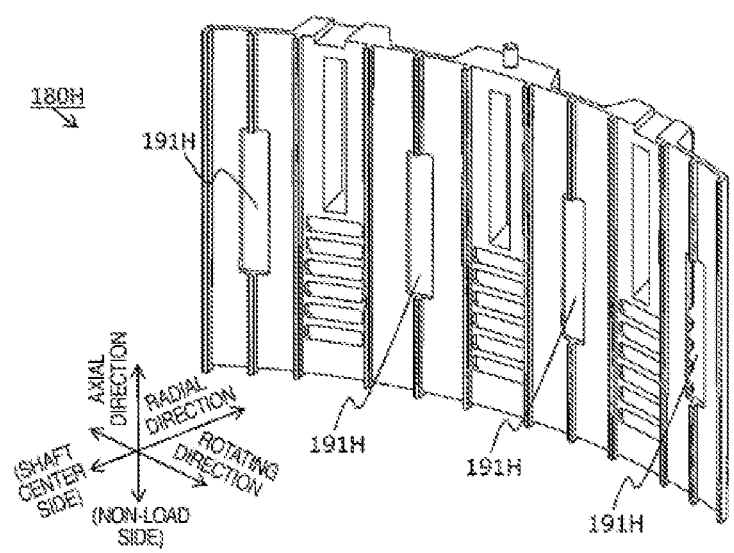

FIG. 10 illustrates a modification of the wiring piece 180 of the second embodiment. FIG. 10(a) is a perspective view of a wiring piece 180H according to the modification observed from the outer diameter side. FIG. 10(b) is a perspective view schematically illustrating the wiring piece 180H observed from the shaft center side. The modification differs from the second embodiment mainly in that the base 181 further includes through holes 191H. Each through hole 191H is located between both ends of the base 181 in the rotating direction and between the thick portion 182 and the guide portion 88 disposed adjacent to each other in the rotating direction. The through holes 191H are rectangular-shaped with vertically long sides in the axial direction. Alternatively, the through holes 191H may be in other shape formed of, for example, a plurality of through holes 191H each having a small diameter disposed in the axial direction. The through holes 191H provided in the base 181 facilitates go-around of the resin for the wiring piece 180 extending in the axial direction by the extended portion 181a.

Figure 11A:
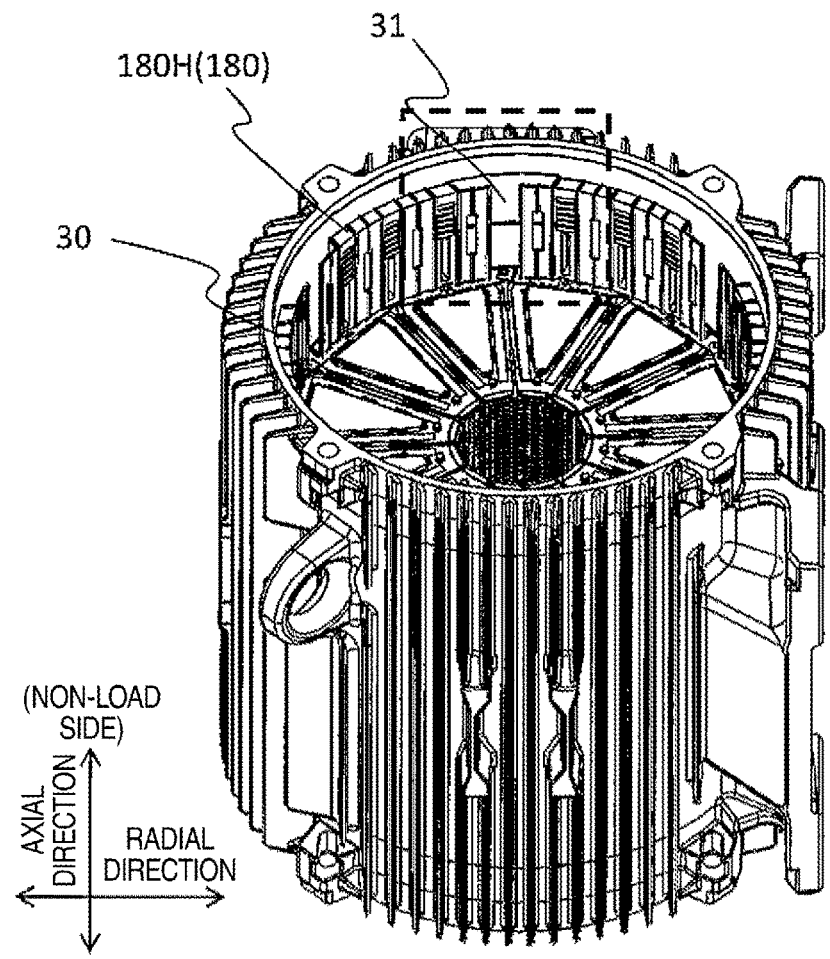
FIGS. 11A and 11B include a perspective view and a partial enlarged view schematically illustrating arrangement of the stator and the wiring piece disposed in the housing according to the modification of the second embodiment.
Figure 11B:
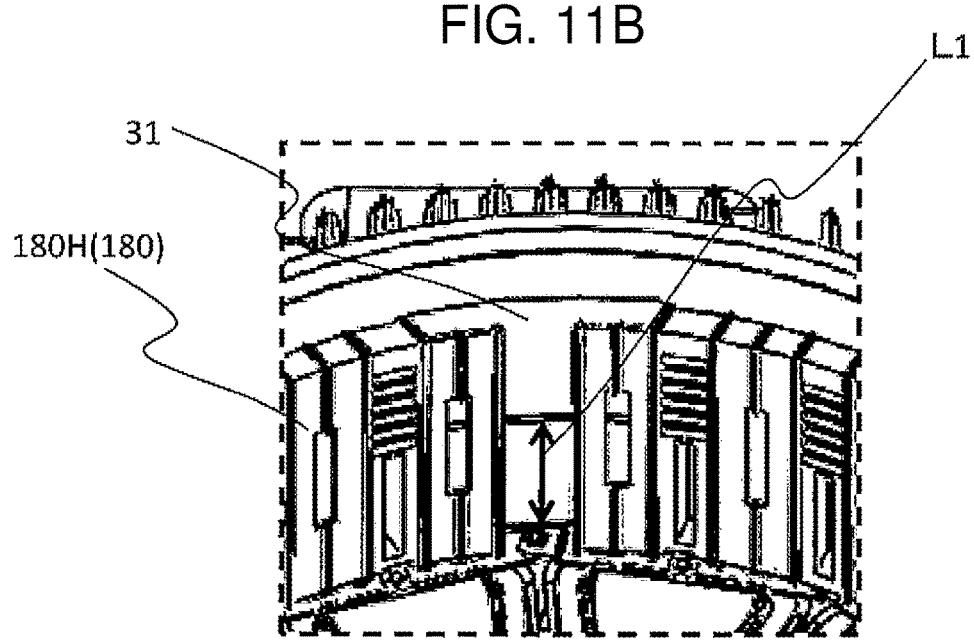

FIG. 11(a) schematically illustrates the wiring pieces 191H and the stator 10 disposed in the housing 30. FIG. 11(b) is a partial enlarged view of a portion surrounded by a dot line of FIG. 11(a). In the drawing, the end face of the stator 10 in the axial direction is apart from the opening edge of the outlet 31 on the stator side by a distance L1 in the axial direction (which is larger than the separation distance of the first embodiment illustrated in FIG. 7). If a distance between the groove for arranging the crossover wire located nearest to the stator 10 of the wiring piece 180 and the end face of the stator 10 in the axial direction is smaller than L1, a part of or the entire length of the crossover wire 70 is arranged (e.g., arranged obliquely) in the outlet 31 via the region L1 from each groove when the crossover wires 70 go out of the outlet 31. This structure may damage the stability of the crossover wire 70 relative to the sealing pressure of the molding resin 15 or the vibrations in activation of the electric machine.

Therefore, the extended portion 181a of the wiring piece 191H serves as a buffer to compensate for the difference of the separation L1 to match the horizontal position of all crossover wires 70 disposed on the wiring pieces 191H to the outlet 31. Thus, the crossover wires 70 disposed on the wiring pieces 191H are located horizontally in the opening width of the outlet 31 in the axial direction, preventing improper bending or posture of the crossover wires 70 that are bundled near the outlet 31, thus guarantees stability of the crossover wires 70.

Meanwhile, the extended portion 181a may increase structural resistance in going around of resin, the through holes 191 or 191H eliminates such resistance and allows maintaining of and insulating characteristics of the crossover wires 70 simultaneously.

According to the second embodiment, as described above, the maintaining of and the insulating characteristic of the crossover wires 70 can be achieved, while providing variable distance in the axial direction with the outlet.

The embodiments of the present invention have been described, but it is not intended to limit the invention by the embodiments described above, and various other modifications and replacement may be carried out without departing from the scope of the invention.

For example, in the above-described embodiment, the wiring piece 80 (180, 180H) and the core unit 14 are arranged using the positioning portion 84. Alternatively, these components may be fixed with each other with, for example, an adhesive, bolts, rivets, or other engagement members.

Further, in the above-described embodiment, each crossover wire 70 is arranged in the groove (gap) formed by two guiding projections 88a. Alternatively, two or more crossover wires 70 are arranged in one groove (gap) in the radial or axial direction. This reduced the diameter measurement or the axial measurement of the electric machine 100 according to specifications.

Further, in the above-described embodiments, the housing 30, the core units 14, and the wiring pieces are integrally covered by the molding resin 15. Alternatively, a resin mold disposed on the outer periphery side may be used instead of the housing 30. This structure can be adapted to a case of manufacturing a resin mold stator as a part, or manufacturing and disposing such a resin mold stator in the housing 30 and fixing it with an adhesive, bolts, or engagement members.

Further, in the above-described embodiments, the wiring pieces are disposed on the non-load side of the electric machine 100, but may also be disposed on the load side. Further, the armature structure including one stator and two rotors has been described, but the structure may include two stators and one rotor, or two or more stators and rotors.

Further, the above-described embodiments have been adapted to the electric machine, but may also be adapted to a power generator.

REFERENCE SIGNS LIST

10 Stator
11 Core
12 Winding
13 Bobbin
13a Guard portion
13b Tubular portion
14 Core unit
15 Molding resin
20 Rotor
21 Permanent magnet
22 Back yoke
23 Yoke
30 Housing
31 Outlet
End bracket
50 Rotating shaft
60 Bearing
70 Crossover wire
80•180•180H Wiring piece
81•181 Base
82 Retaining portion
83a•83b Flow channel projection
181a Extended portion
86 Radial through hole
88 Guide portion
88a Guiding projection
88b Continuous guiding projection
100 Electric machine
190 Thick portion
191•191H Through hole

The invention claimed is:

1. An axial gap type rotary electric machine comprising a stator configured by annularly disposing a plurality of core units about an axis of rotation, each core unit at least including a core, a winding disposed around an outer periphery of the core, and a crossover wire drawn out from the winding, at least a rotor configured to face an axial end face of the core via a gap, and a rotating shaft configured to rotate with the rotor, the axial gap type rotary electric machine comprising:
a plurality of wiring support portions provided on an axial end face side and an outer diameter side of the stator, each wiring support portion including a base having an arc shape and extending in a rotating direction along an annular shape on the outer diameter side of the stator;
in the base having a length extending over the end face on the outer diameter side of adjacent two or more of the core units and a predetermined width in an axial direction, a plurality of grooves provided in the axial direction and configured to guide the crossover wire in a rotating direction on a surface of the base opposite to the rotating shaft in a radial direction; and
a molding resin for integrally molding the wiring support portions and the stator.

2. The axial gap type rotary electric machine according to claim 1, wherein
the grooves extend in the rotating direction.

3. The axial gap type rotary electric machine according to claim 1, wherein
the wiring support portions each include sets of the grooves disposed in the axial direction, the sets of the grooves disposed at predetermined intervals in the rotating direction.

4. The axial gap type rotary electric machine according to claim 1, wherein
each of the grooves has a width in the axial direction on an opening side smaller than a width of a region where the crossover wire is arranged.

5. The axial gap type rotary electric machine according to claim 1, wherein
each of the grooves has a through hole penetrating through the base from a bottom of the base.

6. The axial gap type rotary electric machine according to claim 1, wherein
the base includes a plurality of protrusions extending in the axial direction, provided on the surface on the rotating shaft center side in the rotating direction, with a molding resin disposed between adjacent protrusions.

7. The axial gap type rotary electric machine according to claim 1, further comprising:
a housing configured to store the stator and the rotor and including an outlet to externally draw out the crossover wire, wherein
the stator, the crossover wire, the wiring support portions, and an inner periphery of the housing are integrally molded with the molding resin.

8. The axial gap type rotary electric machine according to claim 7, wherein
the base includes an extended portion extending to the stator side from the plurality of grooves,
the outlet has a width in the axial direction that horizontally covers the width of the grooves in the axial direction, and
the extended portion has a length in the axial direction coinciding with a distance from one of the grooves nearest to the stator to the end face of the stator in the axial direction.

9. The axial gap type rotary electric machine according to claim 8, wherein
the extended portion includes at least one through hole penetrating through in the shaft center direction.

10. The axial gap type rotary electric machine according to claim 1, wherein
the wiring support portions are disposed on a non-load side of the stator.

11. The axial gap type rotary electric machine according to claim 1, wherein
at least part of a projection surface of the wiring support portions overlaps the rotor in the radial direction.

12. The axial gap type rotary electric machine according to claim 1, wherein
the base includes a plurality of projections each extending for a predetermined width on the outer diameter side from the surface opposite to the rotating shaft in the radial direction and disposed in the axial direction via a gap, and
the grooves are each formed by the gap.

* * * * *